United States Patent
Kernick et al.

[15] 3,697,855
[45] Oct. 10, 1972

[54] HYSTERESIS-LOOP CONTROL FOR A POWER TRANSFORMER

[72] Inventors: Andress Kernick, Lima; Glenn W. Ernsberger, Worthington, both of Ohio

[73] Assignee: Westinghouse Electric Corporation, Pittsburgh, Pa.

[22] Filed: Oct. 26, 1970

[21] Appl. No.: 83,957

[52] U.S. Cl. ............... 321/9 A, 321/12, 321/25, 321/45 R, 323/56, 323/89 C
[51] Int. Cl. ............................. H02m 7/42, G05f
[58] Field of Search .......... 321/9, 9 A, 16, 18, 25, 38, 321/45 R, 12; 332/14; 330/10; 323/56, 89 C; 324/127

[56] References Cited

UNITED STATES PATENTS

| | | |
|---|---|---|
| 3,439,251 | 4/1969 | Schaefer .................. 321/2 X |
| 3,539,905 | 11/1970 | Schwarz .................. 321/2 X |
| 3,541,428 | 11/1970 | Schwarz .................. 321/25 X |
| 3,419,791 | 12/1968 | Mishkovsky ........... 324/127 X |
| 3,383,582 | 5/1968 | Bishop et al. ............. 321/18 |
| 3,214,672 | 10/1965 | Watkins .................... 321/16 |
| 3,541,461 | 11/1970 | Brendzel ................... 330/10 |

FOREIGN PATENTS OR APPLICATIONS

| | | |
|---|---|---|
| 1,230,489 | 12/1966 | Germany ............... 321/9 A |

*Primary Examiner*—William A. Beha, Jr.
*Attorney*—F. H. Henson, C. F. Renz and M. P. Lynch

[57] ABSTRACT

This invention relates to the use of a magnetic sensing device for monitoring the magnetic flux condition in the core of an inverter output transformer as a means for developing an inverter control feedback signal indicative of an unbalance in the magnetic flux between alternate half cycles of an inverter AC output voltage waveform developed across the output transformer.

2 Claims, 7 Drawing Figures

INVENTORS
Andress Kernick &
Glenn W. Ernsberger

Michael P. Lynch
ATTORNEY

HYSTERESIS-LOOP CONTROL FOR A POWER TRANSFORMER

BACKGROUND OF THE INVENTION

A small DC component of unbalance between the volt-seconds of alternate half cycles in the operation of the output power transformer of a DC-AC static inverter can result in eventual "firing" of the magnetic core of the power transformer on one end of its unsymmetrical hysteresis loop. The intensity of the exciting current under "fired", or saturated core, conditions can exceed the highest instantaneous load current on the inverter several times over unless some preventive measure is taken. A new problem arises in advanced static inverter circuits which is not answered adequately by any of the heretofore used approaches such as core gapping and early termination of power-switch half-cycle conduction. In these advanced inverters which produce a prescribed fundamental-frequency waveform (usually a sine wave) by numerous discrete switching cycles per period which produce a plurality of voltage pulses, the integrity of the waveform depends upon each of the controlled segments, or voltage pulses, per half-period remaining intact; therefore, the advanced inverters cannot allow half-period balance control which would tamper only with the latter segment or segments of the waveform. Whatever corrective action that is to be taken must be distributed evenly among the discrete segments per half cycle generated by the advanced inverter approach.

One of the major causes of DC component in inverters arises because of inadvertent switching-time errors. In the advanced inverter approaches the problem worsens considerably as there arises an accumulation of these switching-time errors from the generation of multiple segments, where in conventional square-wave or quasi-square-wave approaches there is but one controlled segment per half period.

A potential runaway condition is avoided by sensing the condition of the power transformer rather than attempt to balance volt-seconds by means of an independent device. Once saturation is impending in the power transformer the increase in exciting current tends to reduce volt-seconds delivered through the driving-source internal impedance (the conventional way of controlling saturation); however, an independent sensing device might choose to make up these lost volt-seconds and thereby lose stability.

SUMMARY

A magnetic sensing device is employed to monitor the magnetic flux condition of the core of the inverter output transformer during the alternate half cycles of the inverter AC output voltage waveform. If an unbalance occurs between the magnetic flux of alternate half cycles the magnetic sensing devices transmits a signal representative thereof to a power transformer antisaturation circuit which in turn develops a feedback signal.

This feedback signal is supplied to the control circuit which operates to control the generation of said plurality of positive and negative half cycle voltage pulses to adjust the volt-second content of these voltage pulses to reestablish approximate balance between the magnetic flux conditions of the positive and negative half cycles of the inverter AC output voltage waveform.

A particularly useful magnetic sensing device comprises a small C core which bridges a small stepped gap in the power transformer core without making contact with the power transformer core. The stepped gap is relatively free of magnetic flux except when power transformer core saturation at one end of the hysteresis loop is impending. Coil (A) associated with the C core respond to the presence of magnetic flux in the stepped gap by transmitting a signal to the antisaturation control circuit.

DESCRIPTION OF THE DRAWING

FIG. 2 is a schematic illustration of a static inverter circuit embodying the invention;

DESCRIPTION OF THE PREFERRED EMBODIMENT

The utilization of this invention to develop a feedback signal indicative of magnetic flux unbalance between positive and negative half cycles of a static inverter AC output voltage waveform as a means for adjusting the volt-seconds of the discrete inverter switching segments per inverter half cycle to reestablish magnetic flux balance will be described in connection with the inverter system schematically illustrated in FIG. 1. This inverter system has been selected to provide clear understanding of the invention. it will be apparent that the invention has application of other inverter systems as well.

Figure 1:
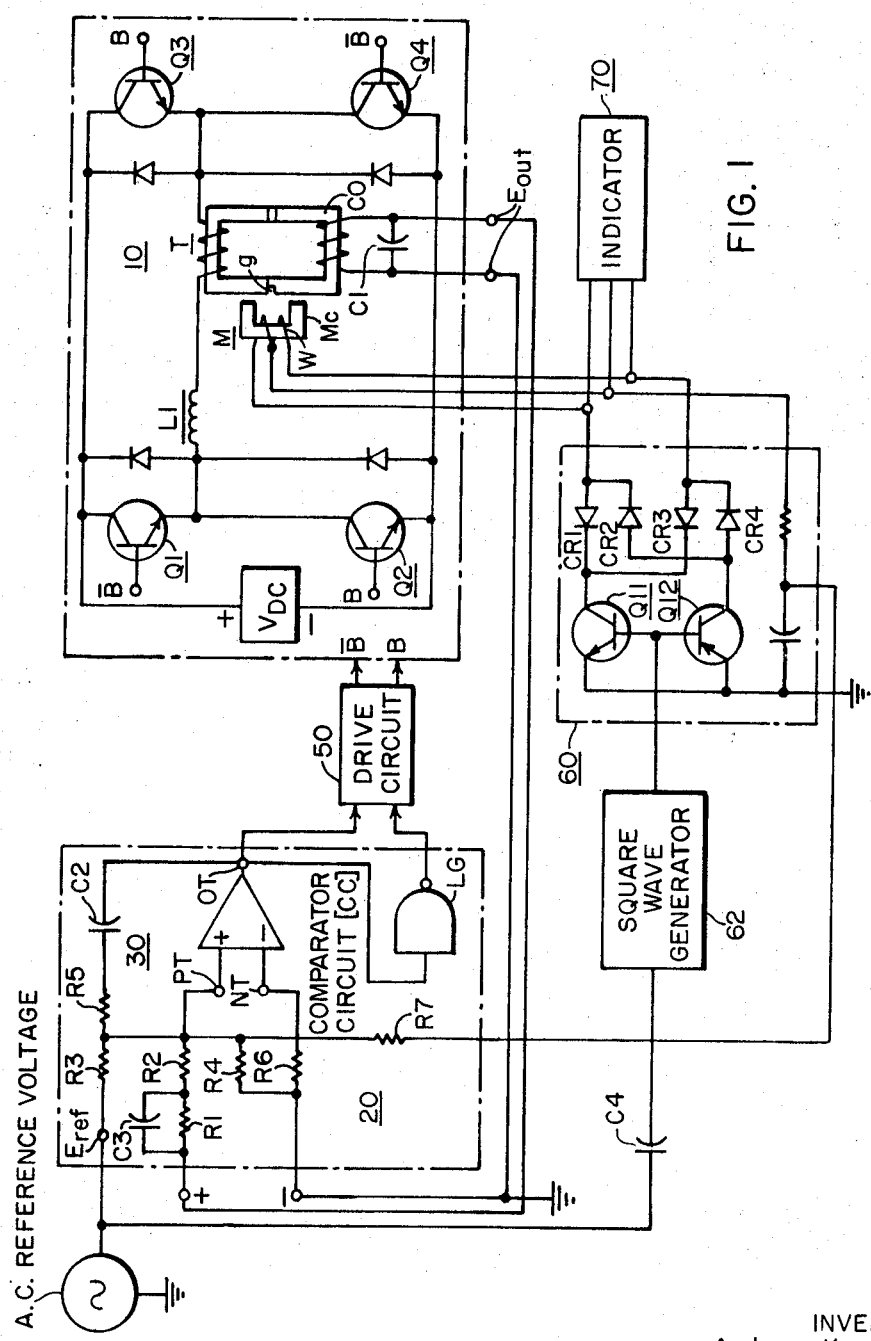

A specific mode of operation of the inverter system of FIG. 1 is described in detail in the copending application Ser. No. 014,314, entitled Apparatus For Producing A Low Distortion Pulse Width Modulated Inverter Output, filed Feb. 26, 1970 and assigned to the assignee of the present invention.

Referring to FIG. 1 there is illustrated schematically a typical inverter bridge power stage 10 including power switches Q1, Q2, Q3 and Q4, a DC voltage source $V_{DC}$, and a power switch conduction control circuit 20 for generating power switch gating signals B and $\bar{B}$. The inverter circuit output voltage, $E_{out}$, appearing across the inverter output transformer T is developed by the controlled alternate conduction of the power switch pairs Q1 and Q4, and Q2 and Q3. The resulting pulse-width-modulated pulse pattern is filtered by the choke L1 and the capacitor c1 to produce an harmonically neutralized output waveform, typically a sine wave.

The control circuit 20 operates to minimize distortion of the inverter output voltage $E_{out}$ by controlling the conduction of the inverter power switches Q1 through Q4 as a function of the divergence of the inverter output voltage from a reference voltage of controlled magnitude and frequency. The control circuit 20 in essence imparts a random gating of the inverter switch pairs through a drive circuit 50 in response to a preset variance of the magnitude of the inverter output voltage waveform from the reference voltage waveform and in so doing essentially forces the inverter output to duplicate the reference voltage waveform. The frequency of the AC reference corresponds to the desired inverter output frequency.

Figure 3:
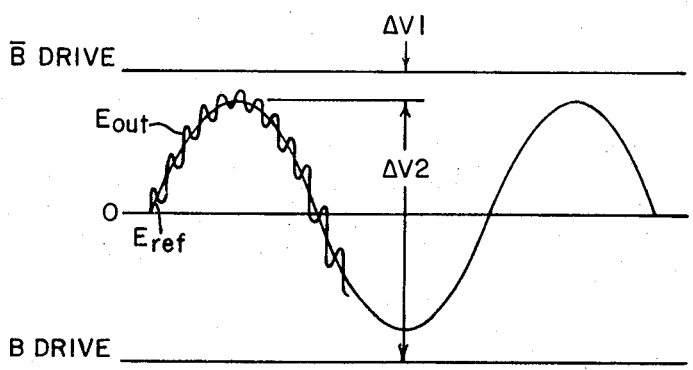
FIGS. 3 and 4 illustrate the operation of the static inverter of FIG. 1.
Figure 4:
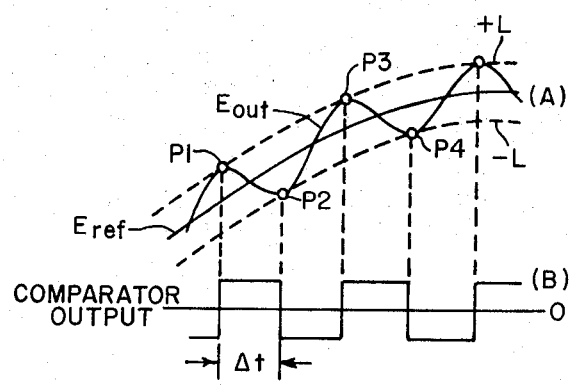

The control circuit 20 includes a comparator circuit CC having a positive input terminal PT, a negative input terminal NT, a positive feedback circuit 40 and an output terminal OT. The filtered inverter output voltage $E_{out}$, the AC reference voltage $E_{ref}$ produced by AC voltage source 30, and a feedback signal from the feedback circuit 40 are combined and applied to the comparator circuit input terminal PT through an input resistor network comprised of resistor R1, R2, R3 and R5. The comparator circuit CC operation is illustrated by the waveforms of FIGS. 3 and 4. Inverter output waveform $E_{out}$ is illustrated as an AC waveform containing distortion and transients whereas the AC reference waveform $E_{ref}$ is illustrated as an AC waveform exhibiting essentially zero distortion and free of a DC component. The variation of the inverter outout voltage $E_{out}$ beyond preset limits +L and −L relative to the AC reference voltage, as illustrated in waveform 4A, results in the generation of comparator circuit plus and minus output voltage signals as illustrated in waveform 4B, which corresponds to points P1, P2, P3, P4, . . . of waveform 3A. The comparator circuit output voltage signals, in the form of drive signals B and $\bar{B}$ from the drive circuit 50, control the gating of the inverter power switches Q1 through Q4 to maintain the inverter output voltage $E_{out}$ within the limits +L and −L. The application of the B and $\bar{B}$ drive signals by the drive circuit 50 for gating the power switches Q1 to Q4 may be typically accomplished according to the teachings of U.S. Pat. No. 3,412,316 issued to the inventor on Nov. 19, 1968 and assigned to the assignee of the present invention.

The feedback circuit 40, which comprises capacitor C2 and a divider network including resistors R4 and R5, functions to apply a portion of the comparator circuit output signal to the positive input terminal PT.

The limits +L and −L are established by the resistors R4 and R5 of the feedback circuit 40. An inherent hysteresis, or error band region, is defined by the limits +L and −L relative to the AC reference voltage $E_{ref}$. This hysteresis provides a finite time interval, $\Delta t$, between the successive switching instants P1, P2, P3, P4 . . . of the power switches Q1 to Q4 by the B drive outputs as illustrated in FIg. 4. For a proper selection of the components of the feedback circuit 40, the value of the limits +L and −L and consequently the finite time interval $\Delta t$, can be altered so as to equal or exceed the storage time of the power switches and thus enable the gating pulses applied to the inverter power switches to drive the power switches into saturation thereby minimizing the forward drop loss of the power switches and preventing loss or "feathering" of a power switch gate pulse. When the finite time interval $\Delta t$ is greater than the power switch storage time there is no significant inverter output waveform distortion produced by nominal gate pulse transport lag.

The capacitor C2 of the feedback circuit 40 effectively isolates the input terminal PT from any average DC voltage which may be present at the output terminal OT by the comparator circuit CC.

The operation of the control circuit 20 in generating the drive signals B and $\bar{B}$ is the same regardless of the polarity of the inverter output $E_{out}$. There is no requirement for logic flip-flop generally included in inverter circuits to account for changes in the inverter output polarity.

The output of the comparator circuit CC changes between B and $\bar{B}$ as the net difference between the inverter output $E_{out}$ and the AC reference $E_{ref}$ exceeds the value of the appropriate limit, either +L or −L, established by the resistors R4 and R5.

The comparator circuit CC produces a positive output signal where a net positive signal exists at the positive input terminal PT as a result of the combination of a signal proportional to the inverter output voltage $E_{out}$, a signal proportional to the AC reference voltage $E_{ref}$ and a signal proportional to the present limit −L which is established by the feedback circuit 40. An output signal is manifested by the $\bar{B}$ drive signal from the logic NAND gate LG which, through the operation of drive circuit 50, gates power switches Q1 and Q4 into a state of conduction in order to return the inverter output voltage $E_{out}$ within the preset limits +L and −L. Conversely, the comparator circuit CC output signal becomes negative when a net negative signal exists as the comparator circuit input terminal PT as a result of the combination of the signal proportional to the inverter output voltage $E_{out}$, a signal proportional to the AC reference voltage $E_{ref}$ and a signal proportional to the preset limit +L which is established by the feedback circuit 40. This comparator circuit output signal is manifested by a B drive signal from the comparator circuit CC. The B drive signal functions to gate the power switches Q2 and Q3 to a state of conduction to reverse the positive trend of the inverter output voltage $E_{out}$ and return the output voltage within the preset limits +L and −L. In the case of a B drive signal that provides compensation for an inverter output voltage $E_{out}$ which exceeds the limit +L, the feedback circuit 40 functions to maintain the corrective effect of the positive B drive signal until the inverter output voltage $E_{out}$ reaches the negative limit −L. Conversely in the event of a $\bar{B}$ drive signal from a comparator circuit CC, the feedback circuit functions to maintain the corrective effect of the $\bar{B}$ drive signal until the inverter output voltage $E_{out}$ reaches the +L limit.

In addition to the corrective control of the conduction of the inverter power switches thus described, yet another parameter, magnetic flux unbalance in the core CO of the power transformer T as measured by magnetic sensing device M, and output transformer antisaturation circuit 60 provides control of the volt-second content of the half cycles of the AC inverter output waveform $E_{out}$ to prevent core saturation.

Figure 2A:
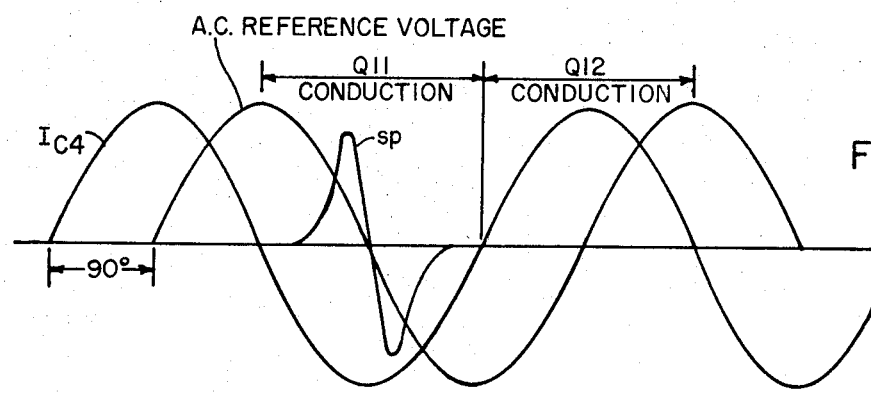
FIGS. 2A and 2B are waveform illustrations of the operation of the invention disclosed in FIG. 1.
Figure 2B:
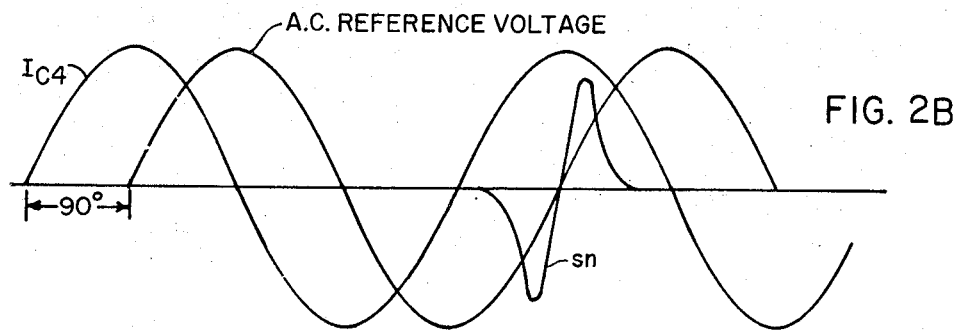

In the particular embodiment illustrated in FIG. 1 the magnetic sensing device M comprises a small "C" core Mc that bridges a stepped gap, or slit, g in the power transformer core CO. The core Mc bridges the stepped gap g in such a way that the gap g is maintained relatively free of magnetic flux except when saturation of the core CO at one end of the transformer hysteresis loop is impending. The core Mc is displaced a few mils away from the core CO so that the magnetic flux is diverted only when magnetic flux is present in the gap g. Balanced magnetic flux conditions in the alternate half cycles of the AC inverter output waveform results in a net zero signal being induced in center tapped winding W which is associated with core Mc. In the event the magnetic flux of the half cycles of the AC inverter output becomes unbalanced, indicating possible impending core CO saturating, winding W develops a signal indicative of the unbalance which is supplied to the power transformer antisaturation circuit 60. The antisaturation circuit 60 is comprised of a synchronous demodulator combination of transistor switches Q11 and Q12 with base bias supplied by the output of square wave generator 62, diodes CR1, CR2, CR3 and CR4, and output signal resistor R7. Square wave generator 62 converts the AC reference voltage waveform into a square wave output which, due to the influence of input capacitors C4, is 90° out of phase with the AC reference voltage. The waveform input relationship of current and voltage for the square wave generator 62 is illustrated in FIGS. 2A and 2B. The transistor switches Q11 and Q12 are turned on alternately so that each transistor is on for 180° with transistor Q11 being on from plus peak reference voltage to minus peak reference voltage and Q12 being on from minus peak reference voltage to plus peak reference voltage.

The diodes CR1, CR2, CR3 and CR4 rectify the signals developed by the center tapped winding W which are illustrated as waveforms SP and SN in FIGS. 2A and 2B respectively. Waveform SP represents magnetic flux unbalance in core CO occurring as a result of excess volt-seconds in the positive half cycle of the AC inverter output waveform while waveform SN represents magnetic flux unbalance in core CO occurring as a result of excess volt-seconds in the negative half cycle of the AC inverter output waveform. The antisaturating circuit 60 develops a DC voltage signal across output voltage resistor R7. This signal is mixed with the signal developed across resistor R3 to adjust the DC component of the AC reference voltage waveform such that the magnitude of the volt-second content voltage pulses of the AC inverter output half cycle exhibiting core CO saturating tendencies are reduced and the volt second content of the voltage pulses of the other half cycle are increased. The adjustment of the volt-second content of the respective half cycles of the AC inverter output waveform reestablishes magnetic flux balance between the alternate half cycles of the AC inverter output waveform thereby preventing core CO saturation.

While the description of the operation of the antisaturating circuit 60 has been concerned with the generation of a DC control signal, the circuit 60 operation may be implemented with other circuits which develop either a DC signal or an AC signal depending upon the inverter system configuration.

Figure 5A:
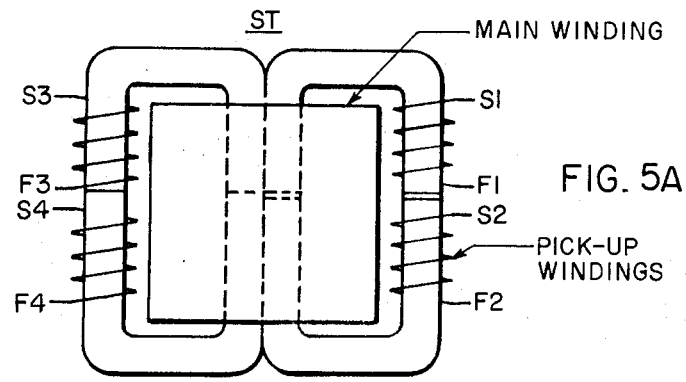
FIGS. 5A and 5B are illustrations of an alternate technique for monitoring magnetic flux condition in an inverter power transformer core.
Figure 5B:
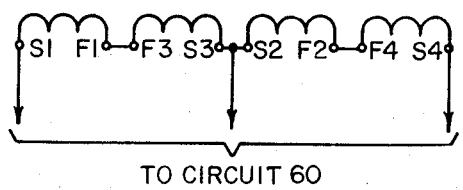

There is illustrated schematically in FIGS. 5A and 5B an alternate configuration of the magnetic sensing device M. This configuration is useful with a shell type power transformer ST. This configuration has the advantage of eliminating the need for a stepped gap. Two identical pick up coils W are placed around the opposite core legs with the pick up windings connected in a center tapped configuration with two windings on each side of the center tap. This configuration is suitable for direct connection to the circuit 60 of FIG. 1.

Furthermore it is apparent that the output of the magnetic sensing device M can be applied to an indicator circuit 70 of FIG. 1 which displays the magnetic flux conditions of the power transformer as a means for determining power transformer saturation.

We claim as our invention:

1. In an electrical power system including an output power transformer the combination comprising, a power inverter circuit means for converting DC input supply voltage to AC output voltage in said output transformer, said power inverter circuit means including a plurality of conduction controlled power switching means operatively connected between the source of said DC input supply voltage and said output power transformer, conduction control circuit means operatively connected to said conduction control switching means to control the conduction of said switching means to develop positive and negative alternate half cycles of said AC output voltage, an AC reference voltage means for supplying an AC reference voltage waveform to said conduction controlled circuit means, said conduction control circuit means controlling the conduction of said switching means to develop an AC output voltage waveform similar to said AC reference voltage waveform, and output power transformer anti-saturation control circuit means including a magnetic sensing means operatively associated with the core of said output power transformer to monitor the magnetic flux condition of said output power transformer during alternate half cycles of the AC output voltage developed in said output power transformer and generating an output signal corresponding to the net value of magnetic flux unbalance between said alternate half cycles, said output power transformer anti-saturation circuit transmitting a first polarity output signal to said conduction control circuit means in response to a net value of magnetic flux unbalance attributed to said negative half cycle of said AC output voltage, and transmitting an opposite polarity output signal to said conduction control circuit means in response to a net value of magnetic flux unbalance attributed to the positive half cycle of said AC output voltage, the magnitudes of said output signals being proportional to the net value of the magnetic flux unbalance, said output signals from said output power transformer anti-saturation circuit being combined with said AC reference voltage waveform to control the volt-second content of said positive and negative half cycles.

2. In an electrical power system the combination comprising, an output power transformer having a stepped gap therein, a magnetic sensing means operatively associated with the core of said output transformer to monitor the magnetic flux condition of said output power transformer during alternate half cycles of the AC output voltage developed in said output power transformer and generating an output signal corresponding to the net value of magnetic flux unbalance between said alternate half cycles, said magnetic sensing means includes a C core and a winding, said winding having a first and second end terminal and a third terminal intermediate said end terminals, said C core bridging said stepped gap, said winding developing said output signal corresponding to said net value of said magnetic flux unbalance between said alternate half cycles of said AC output voltage, and circuit means operatively connected to said magnetic sensing means to interpret said output signal as an indication of output power transformer saturation.

* * * * *